United States Patent [19]

Tsukada et al.

[11] Patent Number: 5,635,635
[45] Date of Patent: Jun. 3, 1997

[54] METHOD AND APPARATUS FOR DETECTING THE INTAKE AIR QUANTITY OF AN ENGINE

[75] Inventors: Masao Tsukada; Hiroshi Aoi; Syoichiro Yokota; Naoki Tomisawa, all of Atsugi, Japan

[73] Assignee: Unisia Jecs Corporation, Atsugi, Japan

[21] Appl. No.: 454,180

[22] PCT Filed: Nov. 18, 1994

[86] PCT No.: PCT/JP94/01958

§ 371 Date: Jun. 22, 1995

§ 102(e) Date: Jun. 22, 1995

[87] PCT Pub. No.: WO95/14215

PCT Pub. Date: May 26, 1995

[30] Foreign Application Priority Data

Nov. 18, 1993 [JP] Japan ................... 5-289029
Aug. 10, 1994 [JP] Japan ................... 6-209308

[51] Int. Cl.$^6$ ................. G01F 1/68; G01F 1/37
[52] U.S. Cl. ............ 73/118.2; 73/202.5; 73/204.11; 73/204.18
[58] Field of Search ............... 73/118.2, 202.5, 73/204.11, 204.15, 204.18, 204.16, 204.23

[56] References Cited

U.S. PATENT DOCUMENTS

| | | | |
|---|---|---|---|
| 4,450,715 | 5/1984 | Sumal | 73/118.1 |
| 4,672,997 | 6/1987 | Landis et al. | 73/202.5 |
| 4,916,948 | 4/1990 | Inada et al. | 73/202.5 |
| 4,922,750 | 5/1990 | Magori | 73/118.2 |
| 5,383,357 | 1/1995 | Doll | 73/118.2 |
| 5,461,910 | 10/1995 | Hodson et al. | 73/202.5 |
| 5,461,913 | 10/1995 | Hinkle et al. | 73/204.15 |

FOREIGN PATENT DOCUMENTS

| | | |
|---|---|---|
| 58-139020 | 8/1983 | Japan . |
| 1-185416 | 7/1989 | Japan . |
| 6-50788 | 2/1994 | Japan . |

*Primary Examiner*—Richard Chilcot
*Assistant Examiner*—George M. Dombroske
*Attorney, Agent, or Firm*—Foley & Lardner

[57] ABSTRACT

The present invention is able to detect the intake air quantity which has been discriminated into flow direction by detecting the engine intake air quantity at two locations separated in the direction of flow of the intake air, comparing the detection values and detecting the flow direction of the intake air based on for example the advance or delay of the phase of the intake air pulsations. As a result, when the flow is reversed, the detection value is subtracted so that a normal flow direction averaged intake air flow quantity is detected, thereby enabling improvement in for example the setting accuracy for the fuel supply quantity of an engine.

21 Claims, 12 Drawing Sheets

METHOD AND APPARATUS FOR DETECTING THE INTAKE AIR QUANTITY OF AN ENGINE

TECHNICAL FIELD

The present invention relates to a method and apparatus for detecting the intake air quantity of an engine.

BACKGROUND ART

With an automotive engine, in order to control for example, the fuel supply quantity, an air flow meter such as a hot wire type flow meter is provided upstream of the intake passage throttle valve to detect the intake air quantity.

With such a conventional engine intake air quantity detection apparatus however, when the throttle valve opening is large in the low speed or high speed range of the engine so that pulsations inside the cylinder, which include reverse flow components, can be transmitted as far as the air flow meter portion, then since the hot wire type air flow meter cannot discriminate between the air flow direction, the intake air flow quantity will be detected as being greater than the true value.

More specifically, since the output of the air flow meter is the same irrespective of whether the air flow direction relative to the air flow meter element is normal or reverse, then considering the case where there is a reverse flow portion in the true intake air quantity Q, the computed average Q will be greater than the true average Q, since in the detection value of the intake air quantity Q, the reverse flow component is also detected as being in the normal direction.

If the computed average Q is greater than the true average Q, this can lead to a richer mixture, deterioration in exhaust conditions, and poorer fuel consumption.

DISCLOSURE OF THE INVENTION

In consideration of such problems with the conventional technology it is an object of the present invention to be able to detect intake air quantity including the flow direction.

It is a further object of the invention to be able to process detection values for the intake air quantity including the flow direction, and thereby accurately detect an average value for intake air quantity in the normal flow direction.

Another object is to be able to accurately set the engine fuel supply quantity using this average value.

A further object is to be able to make a compact intake air quantity detection apparatus.

To achieve the above objectives, the engine intake air quantity detection method, and intake air quantity detection apparatus according to the present invention, as shown in FIG. 1, comprise;

an intake air quantity detection step or device for detecting, irrespective of the flow direction of the intake air, respective intake air quantities at two locations separated in the flow direction of the intake air in the engine intake air passage, a flow direction detection step or device for detecting the flow direction of the intake air, based on the intake air quantity detected at the two locations, an intake air quantity detection signal output step or device for outputting a detection signal for an intake air quantity in which the flow direction has been discriminated, based on an intake air quantity detected at at least one of said two locations, and on said detected flow direction.

With the intake air quantities detected at the two locations, since a phase difference is produced which is dependant on the flow direction of the intake air, then the flow direction of the intake air can be detected based on this phase difference. Therefore, normal flow and reverse flow can be discriminated so that a true intake air quantity can be detected.

The flow direction detection step or device may include, detecting as normal flow when the phase of the pulsations of the intake air quantity detected at the upstream location of the two locations is ahead of the phase of the pulsations of the intake air quantity detected at the downstream location, and detecting as reverse flow when this is behind.

More specifically, since the pulsations of the intake air quantity are advancing waves, then if the flow is normal, the upstream side phase will be ahead of that of the downstream side, while when reverse flow occurs, since this results in an advancing wave in the opposite direction, then upstream side phase will be behind that of the downstream side. Normal flow and reverse flow can thus be discriminated.

The intake air quantity detection step or device may include, detecting the intake air quantity using a hot wire type flow meter which controls an electrical current to a thermo-sensitive resistor provided in the intake passage so as to keep the resistance value of the thermo-sensitive resistor constant, and detects the intake air quantity depending on the current value.

If a hot wire type flow meter is used in this way, then the intake air quantity can be detected as a mass flow rate to a high accuracy, so that the fuel supply quantity to the engine can be accurately set.

Moreover, the intake air quantity detection step or device may include, detecting the intake air pressure using a pressure sensor, and converting the detected pressure into intake air quantity to thereby detect the intake air quantity.

In this case, detection of the intake air quantity can be carried out at low cost by using a comparatively inexpensive pressure sensor.

Furthermore, the intake air quantity detection step or device may involve, detecting the intake air quantity at the upstream location of the two locations using a hot wire type flow meter which controls an electrical current to a thermo-sensitive resistor provided in the intake air passage so as to keep the resistance value of the thermo-sensitive resistor constant, and detects the intake air quantity depending on the current value, and detecting the intake air pressure at the downstream location using a pressure sensor, and converting the detected pressure into intake air quantity to thereby detect the intake air quantity.

In this case, by using the pressure sensor for detecting flow direction only, and using the value detected by the hot wire type flow meter for the absolute value of the intake air quantity, then detection can be carried out at a relatively low cost while maintaining detection accuracy.

Moreover, the intake air quantity detection step or device may involve detecting the intake air quantity based on changes in resistance values, due to intake air cooling, of thermo-sensitive resistors respectively provided at the two locations in the intake air passage.

The flow direction detection step or device may involve, controlling the current to a heating resistor provided at a location between the two locations, so as to maintain a constant temperature, and detecting the flow direction of the intake air based on an inversion of a large/small relationship between the resistance values of the thermo-sensitive resistors at the two locations, corresponding to a change between normal flow and reverse flow of the intake air.

More specifically, when the intake air flow is normal flow, the thermosensitive resistor on the upstream side is practically unaffected by heat from the heating resistor. On the other hand, since intake air with a raised temperature due to the heat generated by the heating resistor passes the downstream side thermo-sensitive resistor, the detection value becomes that for an intake air quantity based on a resistance value affected by the temperature rise. It therefore differs from that of the upstream side intake air quantity detection value. In the case of reverse flow, the upstream side intake air quantity detection value is the one more influenced by the temperature rise. Hence the large/small relationship between the detection values is inverted. The normal flow and reverse flow can therefore be discriminated based on this inversion. Moreover, by maintaining the heating resistor at a constant temperature, then a good intake air quantity detection accuracy can be maintained.

With a device incorporating the flow direction detection step or device having a heating resistor, the intake air quantity detection signal output step or device for each flow direction may involve outputting a signal having a discriminating signal for the detected flow direction attached to an intake air quantity detection signal obtained by adding the intake air quantities detected at the two locations.

In this case, the intake flow quantities in which pulsations occur are averaged by adding the intake flow quantities detected at the two locations. The averaged value is then made an absolute value for the intake air quantity, and an intake air quantity signal for which the flow direction has been discriminated is obtained.

Moreover, with the same device incorporating the flow direction detection step or device having a heating resistor, the intake air quantity detection signal output step or device for each flow direction may involve, outputting an intake air quantity detection signal obtained by subtracting an intake air quantity detection value detected at one of the two locations from an intake air quantity detection value detected at the other of the two locations.

In this case, since as described above, the large/small relationship between the upstream and downstream intake air quantity detection values inverts when the flow direction of the intake air changes, becoming a positive or negative value depending on the flow direction, this may be simply used as a signal for discriminating flow directions. Moreover, since the absolute value of the subtracted values is proportional to the intake air heat with increases due to the heating amount from the heating resistor, and since the heating amount is kept constant, then this value is proportional to the intake air quantity. It can therefore be made a detection signal for the intake air quantity.

Moreover, the thermo-sensitive resistors at the two locations and the heating resistor may comprise films on the surface of a single insulation substrate which is connected to a wall of the intake air passage and aligned with the flow direction of the intake air.

In this case, since the resistors are formed as films, and only a single insulation substrate is required, the number of components can be reduced, and the intake air quantity detection apparatus can be made lightweight, and compact.

Moreover, the construction may be such that the insulation substrate is fitted to the apparatus body so as to face into the intake air passage, with a base end portion connected to the intake air passage wall, and an other end portion as a free end, and with an auxiliary heating element provided on the base end for suppressing the transmission of heat from the heating resistor to the intake air passage wall.

In this case, the amount of heat supplied from the heating resistor to the downstream thermo-sensitive resistor can be stabilized, so that the accuracy of detecting the flow quantity and direction of the intake air can be increased. Moreover, at the time of engine start-up, the device can be heated up quickly to thereby improve detection performance at start-up.

BEST MODE FOR CARRYING OUT THE INVENTION

An embodiment of the present invention will now be described.

Figure 1:
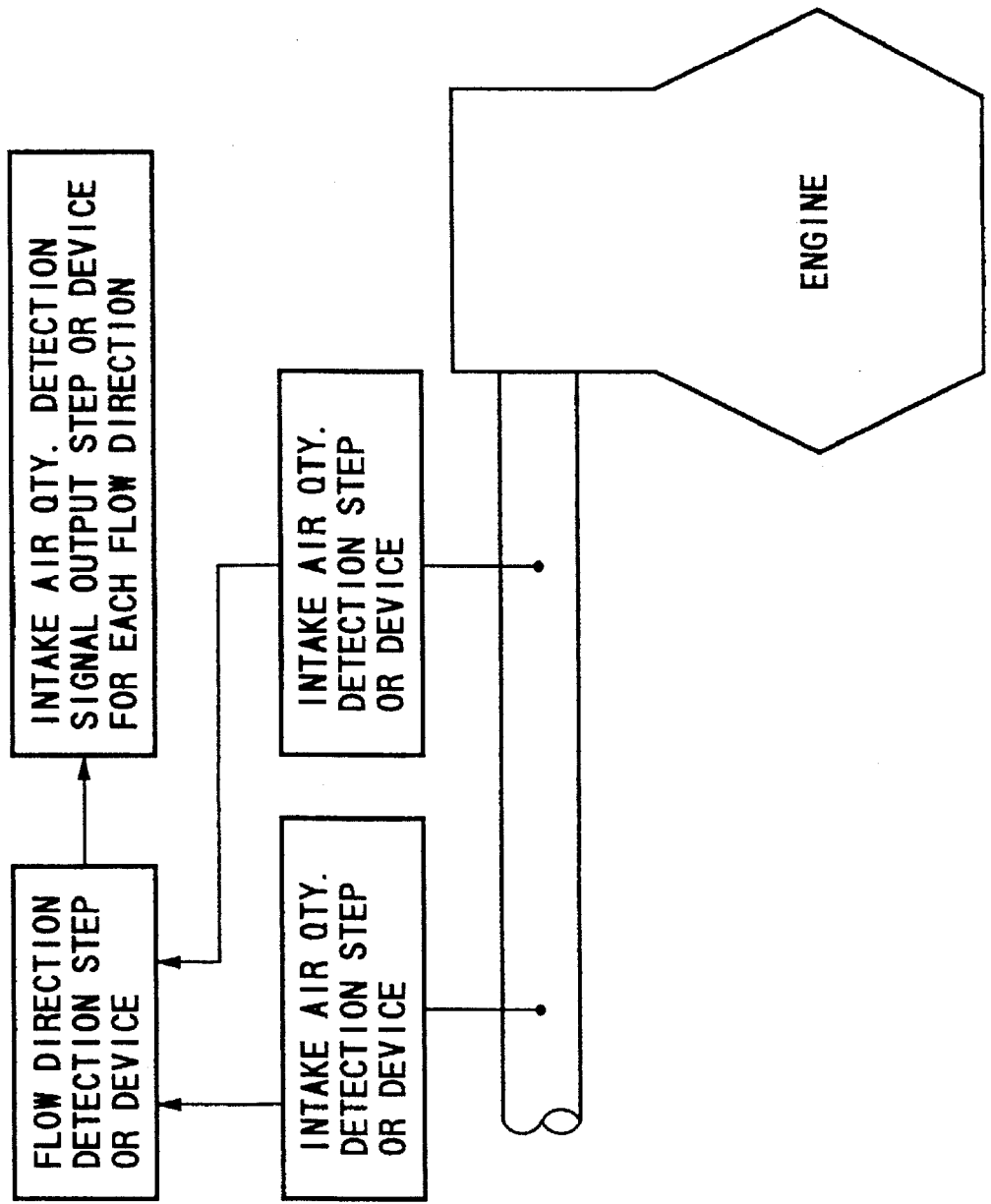
FIG. 1 is a functional block diagram showing a construction of the present invention.
Figure 2:
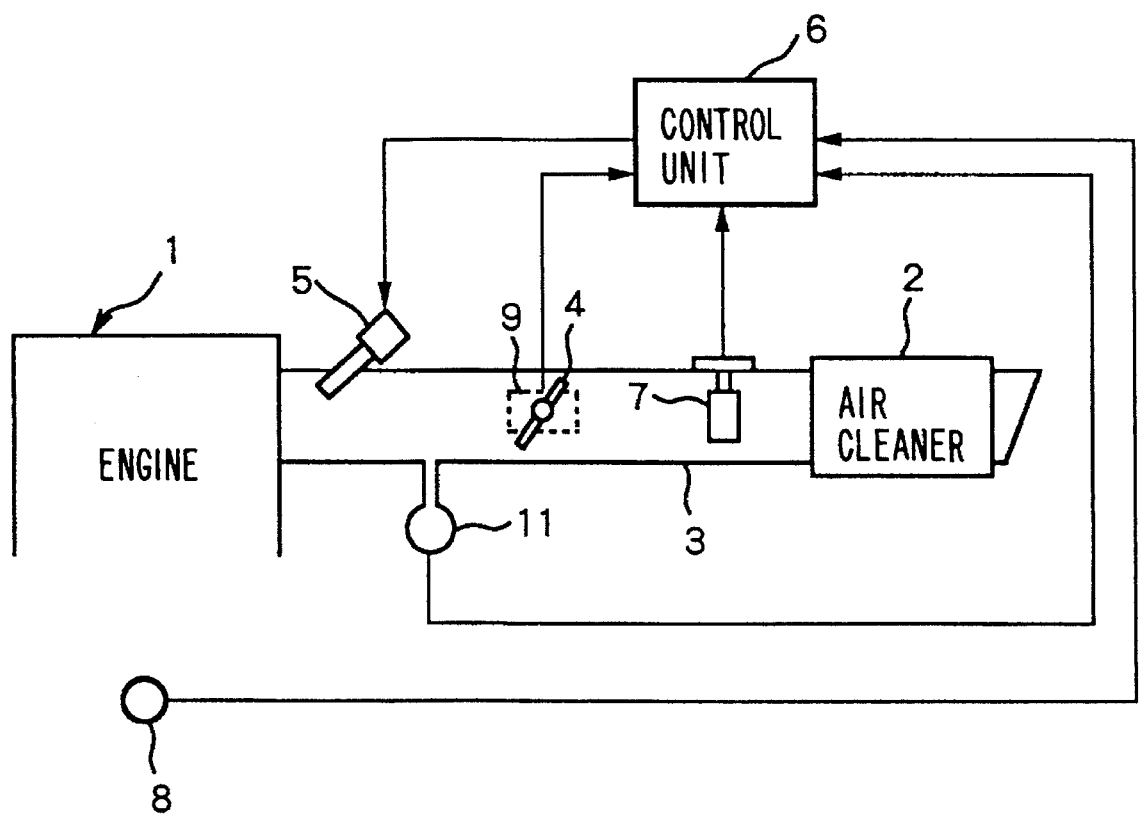
FIG. 2 is a system diagram showing a first embodiment of the present invention.

In FIG. 2 showing a first embodiment, a solenoid type fuel injection valve 5 is provided downstream of a throttle valve 4 in an intake air passage 3 from an air cleaner 2 to an engine 1. A drive pulse signal output from a control unit 6 in synchronism with the engine rotation opens the fuel injection valve 5 for the pulse width time of the signal, to thus carry out fuel injection.

In order to control the fuel injection quantity (pulse width), a signal is input to the control unit 6 from a hot wire type air flow meter 7 (referred to hereunder as air flow meter 7) located upstream of the throttle valve 4 of the intake air passage 3, and having the function of an intake air quantity detection step or means for detecting an intake air quantity Q at one location, irrespective of the flow direction of the intake air. Moreover, signals are also input, from a crank angle sensor 8 for detecting the engine rotational speed N, and from a throttle sensor 9 for detecting the opening (TVO) of the throttle valve 4.

Furthermore, with the construction related to the first embodiment of the present invention, an intake air pressure sensor 11 for detecting the intake air pressure in the intake air passage 3, is provided in the intake air passage 3 downstream of the throttle valve 4, and a signal from the intake air pressure sensor 11 also is input to the control unit 6. When intake air flows in the intake air passage 3, the intake air pressure also changes in the intake air passage 3. This pressure is detected by the intake air pressure sensor 11. Therefore, the intake pressure sensor 11 detects an intake air pressure which is unrelated to the intake flow direction, and which is a quantity corresponding to the intake air quantity. Accordingly, the intake air pressure sensor 11 also has the function of an intake air quantity detection step or means for detecting the intake air quantity at a location separated in the direction of the intake air flow from the air flow meter 7.

Figure 3:
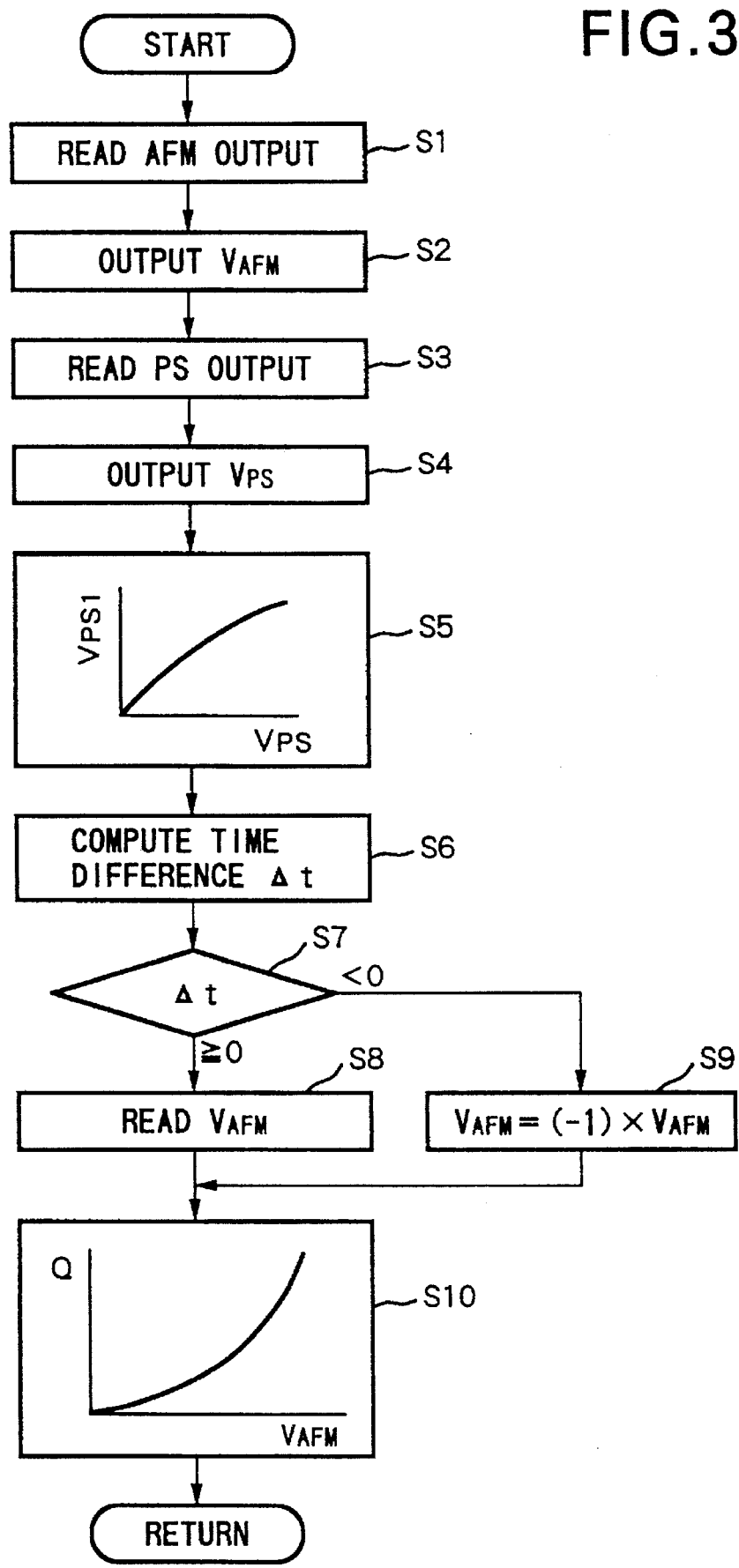
FIG. 3 is a flow chart for a reverse flow detection and intake air quantity detection routine.
Figure 4:
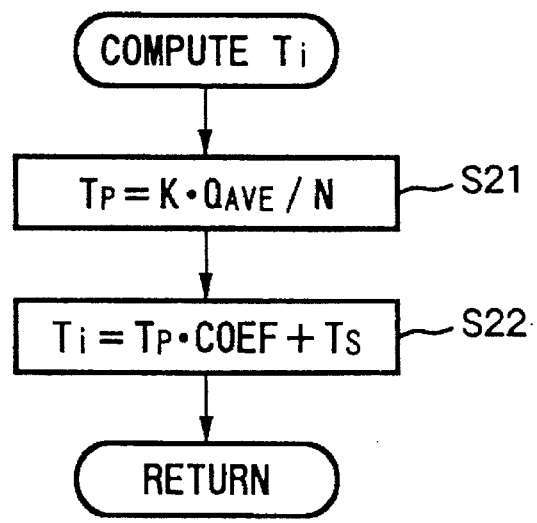
FIG. 4 is a flow chart for a fuel injection quantity computing routine.

The control unit 6 carries out computational processing by means of a microcomputer incorporated therein, according to the flow charts of FIG. 3 and FIG. 4.

FIG. 3 is a routine for detecting the intake air flow direction and intake air quantity.

In step 1 (with "step" denoted by S in the figures), an output AFM of the air flow meter 7 is read.

In step 2, the output AFM read in step 1 is digital converted to obtain a digital output $V_{AFM}$.

In step 3, an output signal PS from the intake air pressure sensor 11 provided downstream of the throttle valve 4 is read.

In step 4, the output signal PS read in step 2 is digital converted to obtain a digital output $V_{PS}$.

In step 5, so that the digital output $V_{ps}$ will have a value equivalent to the digital output $V_{AFM}$ at the time of a predetermined intake air flow quantity, the digital output $V_{PS}$ is converted to obtain $V_{PSI}$.

In step 6, the time difference Δt from when the digital output $V_{AFM}$ obtained in step 2 attains a predetermined value (for example a predetermined voltage value), until the digital output $V_{PSI}$ obtained by conversion in step 5 attains the predetermined value is computed.

In step 7, it is judged if the time difference Δt computed in step 6 is positive or negative, to thereby determine the presence or absence of reverse flow.

Figure 5:
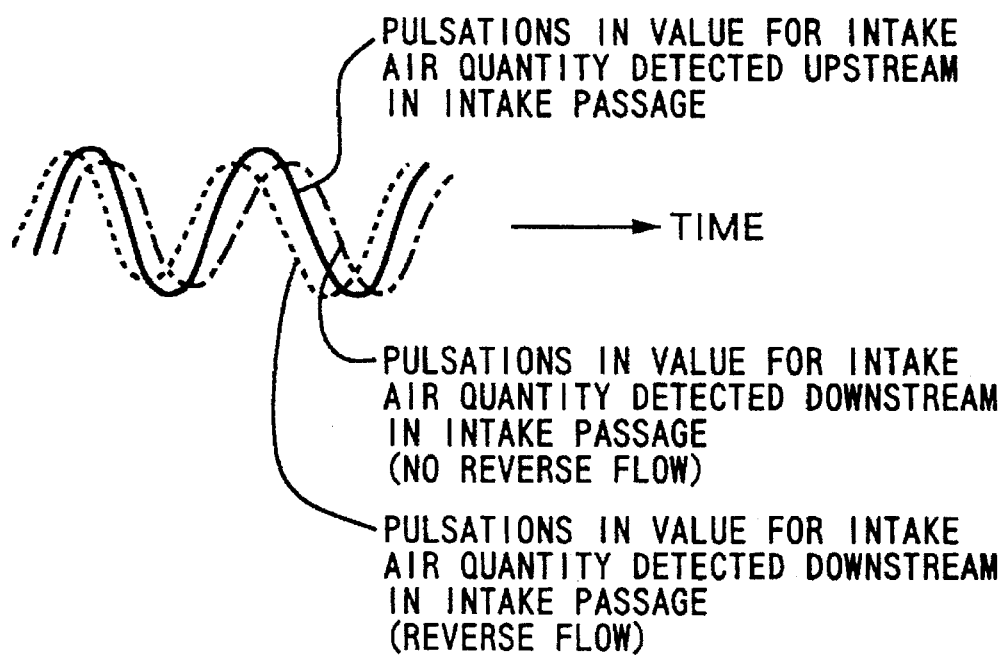
FIG. 5 is a diagram showing an output of an intake air quantity detection device for with and without reverse flow.
Figure 6A:
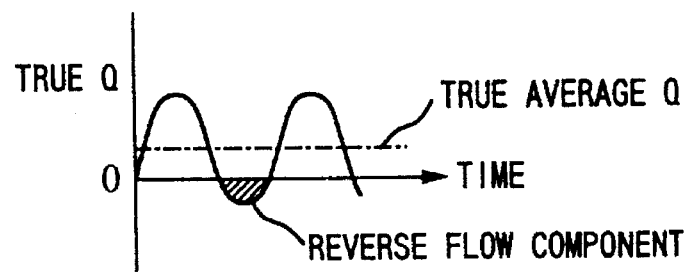
FIGS. 6A–6B are diagrams illustrating a processing method for an intake air quantity detection signal for with and without reverse flow.

More specifically, the output values of the digital output $V_{AFM}$ and the digital output $V_{PSI}$ change depending on the rotational speed N. However, when there is no reverse flow, since the air flow meter 7 is provided upstream of the intake air pressure sensor 11, and since as shown in FIG. 5, the intake air pulsations are advancing waves, then the time that the digital output $V_{AFM}$ attains the predetermined value is earlier than the time that the digital output $V_{PSI}$ attains the predetermined value. Therefore the time difference Δt is positive. That is to say, the phase of the intake air pulsation is advanced. On the other hand, in the event of a reverse flow as shown in FIG. 6(a), the time that the digital output $V_{AFM}$ attains the predetermined value is later than the time that the digital output $V_{PSI}$ attains the predetermined value. Therefore the time difference Δt is negative. That is to say, the phase of the intake air pulsation is delayed.

More specifically, by judging the positive/negative of the difference Δt (advance/delay of the pulse phase), it is possible to determine normal flow or reverse flow. This part corresponds to the flow direction detection step or means.

As a result, in the case of non-reverse flow (Δt≥0), control proceeds to step 8 where the digital output $V_{AFM}$ of the air flow meter 7 is simply read as is.

Figure 6B:
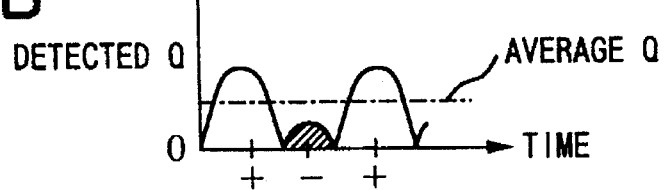

In the case of reverse flow (Δt<0), control proceeds to step 9 where the digital output $V_{AFM}$ of the air flow meter 7 is multiplied by (−1), and correction is carried out so that the value which has been subjected to the subtraction processing is read. Accordingly, the function of step 9 corresponds to the different flow direction intake air quantity detection signal output step or means for each flow detection. This aspect is illustrated by FIG. 6(b).

In step 10, the intake air quantity Q is computed using a characteristic diagram of intake air quantity Q versus digital output $V_{AFM}$ obtained beforehand, based on the digital output $V_{AFM}$ read in step 8 or step 9.

FIG. 4 shows a fuel injection quantity computation routine.

In step 21, the basic fuel injection quantity Tp is computed from the intake air quantity Q detected by the beforementioned routine, and from the engine rotational speed N, according to the following equation. Here, as is normally carried out, the intake air quantity Q is subjected to an averaging process (weighted average etc.) to absorb the pulsations. Since, as mentioned, before subtraction processing is carried out at the time of reverse flow, then the normal flow direction averaged intake air quantity, that is, the true intake air quantity Q necessary for computation of the basic fuel injection quantity Tp, is essentially obtained.

$Tp=K \times Q/N$ (where K is a constant)

In step 22, the basic fuel injection quantity Tp is multiplied by various correction coefficients COEF, and a voltage correction portion Ts is added, according to the following equation, to thereby compute a final fuel injection quantity Ti.

$Ti=Tp \times COEF+Ts$

Once the fuel injection quantity Ti has been computed, then a drive pulse signal of a pulse width corresponding to the fuel injection quantity Ti, is applied to the fuel injection valve 5 at a timing synchronized with the engine rotation, to thereby inject the fuel.

Accordingly, with the first embodiment, the presence or absence of reverse flow is detected based on the output signal AFM from the air flow meter 7 (intake air quantity detection means), and the output signal PS from the intake air pressure sensor 11, and at the time of reverse flow correction is carried out so that a true intake air flow quantity can be detected. Therefore, richening of the mixture in operating regions wherein the engine intake pulsations become large can be avoided, so that deterioration of exhaust performance, and deterioration in fuel consumption can be prevented.

A second embodiment of the present invention will now be described.

Figure 7:
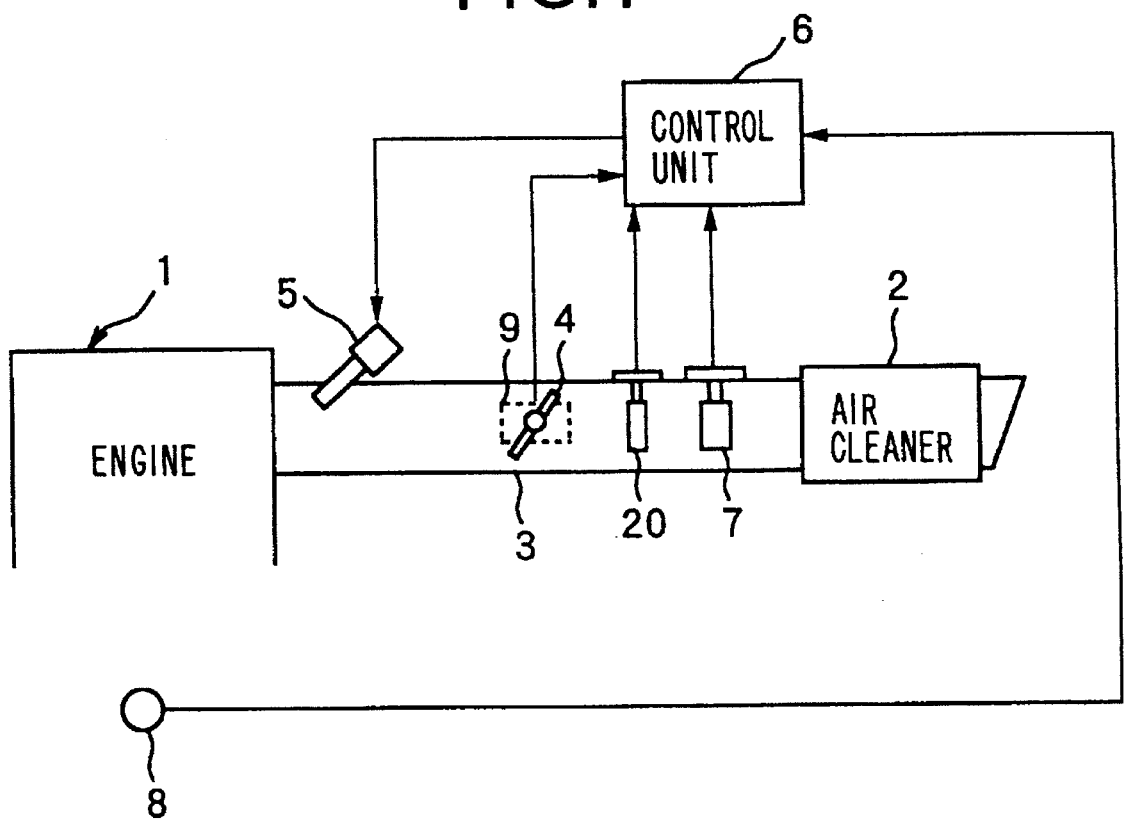
FIG. 7 is a system diagram showing a second embodiment of the present invention.

With the construction according to the second embodiment, as shown in FIG. 7, a second hot wire type air flow meter 20 (referred to hereunder as second air flow meter 20) is disposed in the intake passage 3 between the air flow meter 7 and the throttle valve 4, and signals from the second hot wire type air flow meter 20 are input to the control unit 6. Instead of the second air flow meter 20, it is possible to have an arrangement with two air flow meter chips on an inner portion of the same outer casing as the air flow meter 7. In this case, the second air flow meter 20 has the function of the intake air quantity detection means.

With regards to the flow direction detection routine, it is sufficient to note that in the beforementioned step 3, instead of reading the output signal PS from the intake air pressure sensor 11, the output signal from the second air flow meter 20 is read. Moreover, in step 4, instead of obtaining the digital output $V_{PS}$ from the read output PS, the digital output is obtained from the output signal from the second air flow meter 20.

Accordingly, with the second embodiment also, the same operation and effects as for the first embodiment can be obtained, and in the case of a reverse flow also, a true intake air flow quantity can be detected.

With the second embodiment, the construction is such that the second air flow meter 20 is disposed in the intake air passage 3 between the air flow meter 7 and the throttle valve 4. However, if the second air flow meter 20 is disposed on the upstream side of the air flow meter 7, then obviously the signal processing will be different.

A third embodiment of the present invention will now be described with reference to FIG. 8–FIGS. 11A–11B.

In the figures, a flow meter body 22 constituting the main body portion of a heating type air flow quantity detection apparatus 21 according to the third embodiment, is generally constructed from a winding portion 24 on which reference resistors 23 (23A, 23B) having resistance value R1 are wound, a terminal portion 25 disposed at the base end of the winding portion 24 and provided with a plurality of integrally formed terminal pins (not shown in the figure), a detector holder 26 which extends from the tip end of the winding portion 24 in the diametral direction of the intake passage 3, and a circuit casing 27 (to be described later).

Figure 8:
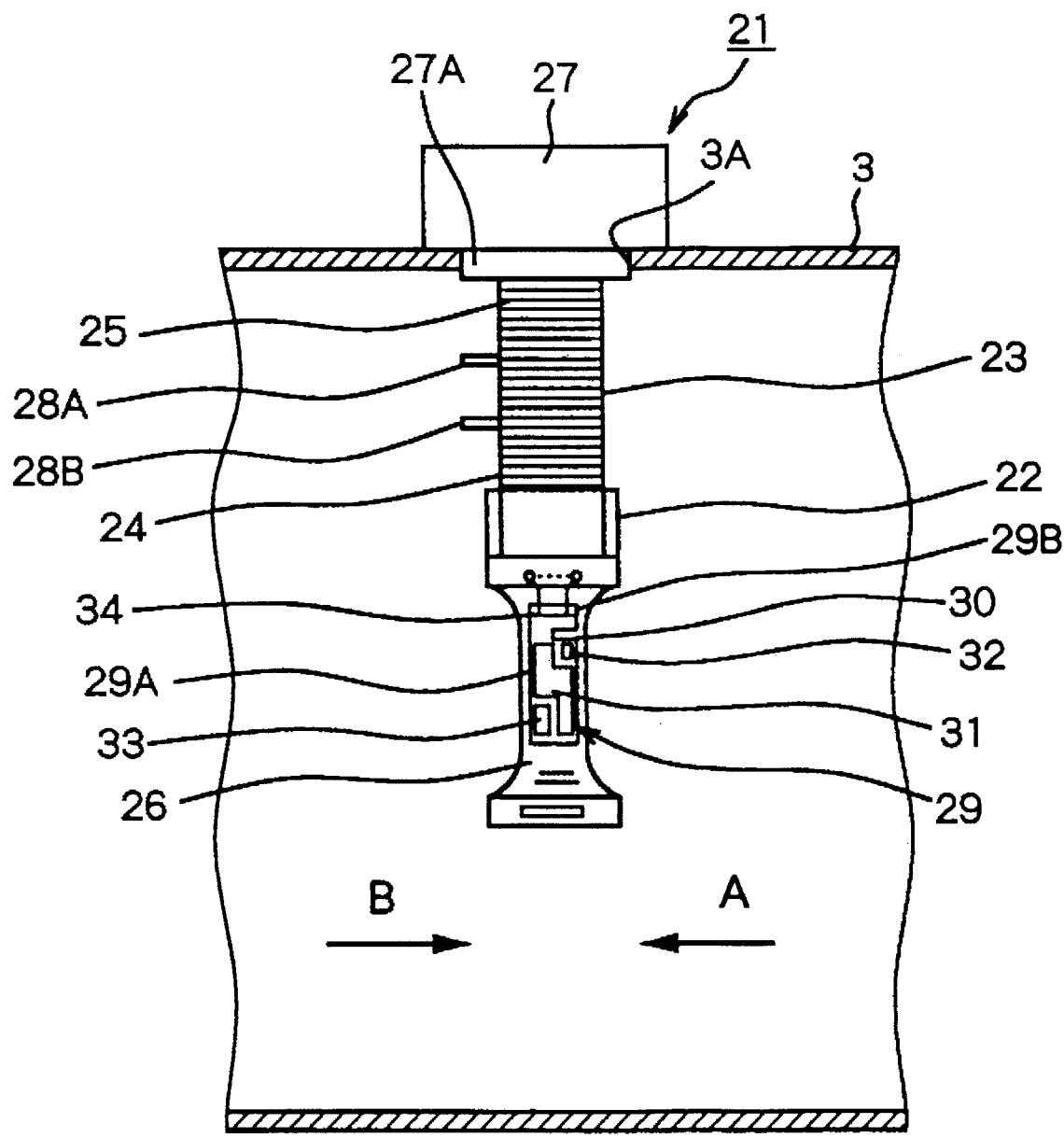
FIG. 8 is a longitudinal sectional view showing a heating type intake air quantity detection apparatus fitted to an intake duct, according to a third embodiment of the present invention.

Formed on the flow meter body 22 is a slot (not shown in the figure) whereby an insulation substrate 29 (to be described later) can be removably fitted to the base end of the detector holder 26. As shown in FIG. 8, the detector holder 26 is constructed so that a heating resistor body 31 and other devices (to be described later) which modify the insulation substrate 29, are positioned at the central portion of the intake air passage 3. A protective cover is fitted to the detector holder 26.

A circuit casing 27 provided on the outside of the intake air passage 3 has an engaging portion 27A for engaging with an attachment aperture 3A in the intake air passage 3 to thereby close off the attachment aperture 3A. The circuit casing 27 houses, for example, a flow quantity adjustment resistor 38 and a differential amplifier (to be described later) mounted on an insulation substrate (not shown in the figures) made of for example a ceramic material. The windings of the reference resistors 23 are connected to terminals 28A, 28B.

Figure 9:
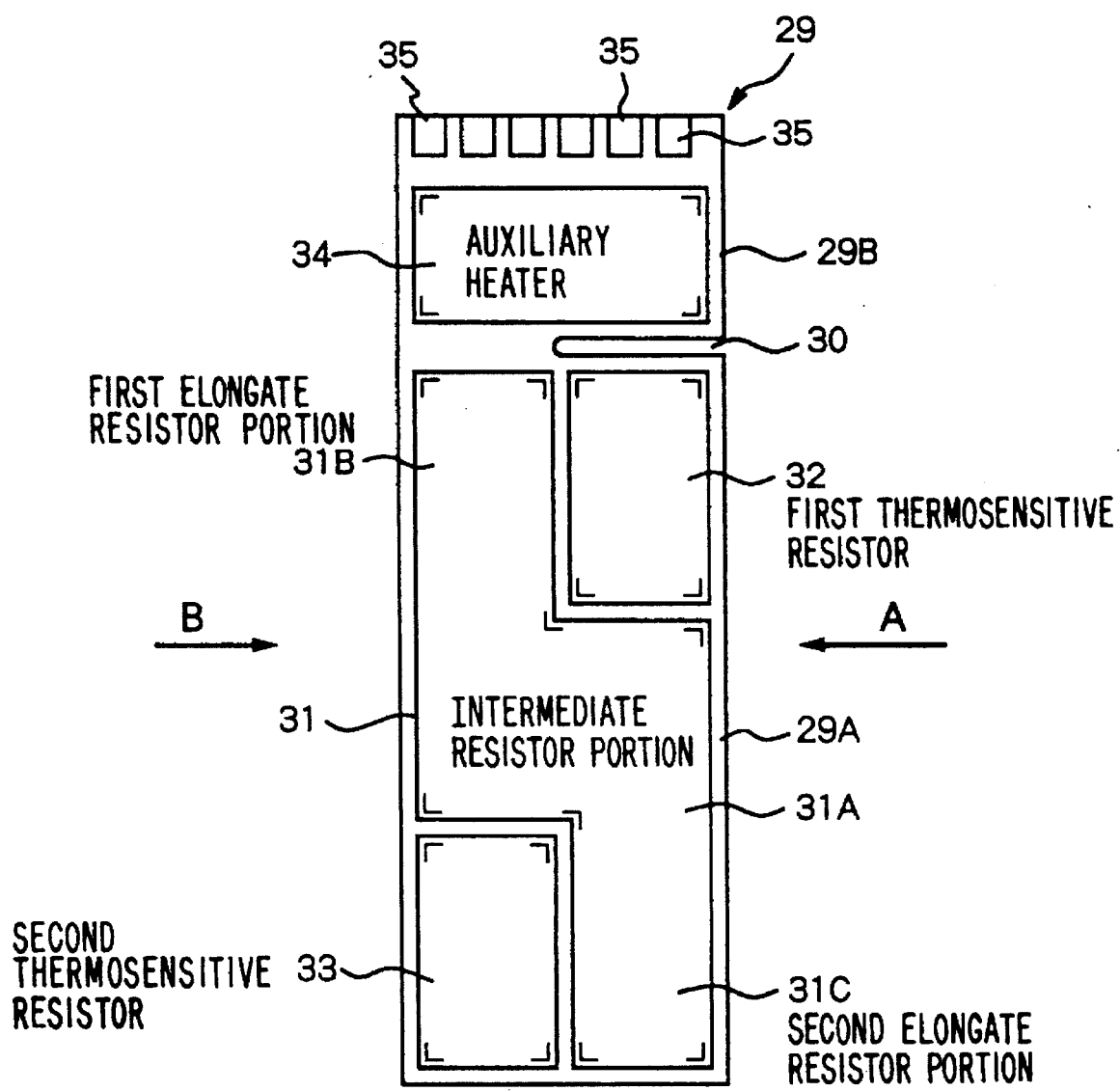
FIG. 9 is a plan view showing a heating resistor, first and second thermo-sensitive resistors, and an auxiliary heater formed on an insulation substrate.

The insulation substrate 29 fitted to the detector holder 26, as shown in FIG. 9, is made from an insulating material such as glass, alumina, aluminium nitride formed as a rectangular planar shape with a longitudinal dimension of around 15~20 mm and a widthwise dimension of around 3~7 mm. Moreover, with the insulation substrate 29, the base end is a fixed end which is removably fitted to the slot of the detector holder 26, while the tip end is a free end.

As shown in FIG. 9, the insulation substrate 29 comprises a main substrate portion 29A located at the tip end, on which a heating resistor 31 (to be described later) and first and second thermo-sensitive resistors 32, 33 are formed as a film, and a sub-substrate portion 29B fitted to the detector holder 26 at the location of the base end of the main substrate portion 29A so as to separate the heating resistor 31 from the detector holder 26, on which an auxiliary heater 34 is formed as a film. A slit 30 is formed between the sub-substrate portion 29B and the main substrate portion 29A in a widthwise direction, from one side towards the opposite side (in the intake air flow direction shown by arrow A).

The heating resistor 31 formed on the main substrate portion 29A of the insulation substrate 29, is formed by coating a platinum film on the main substrate portion 29A using a technique such as printing or sputtering, so as to give a resistance value RH. It comprises an intermediate resistor portion 31A located at a central portion (in a lengthwise direction) of the main substrate portion 29A and extending in a widthwise direction, and first and second elongate resistor portions 31B and 31C extending from opposite ends of the intermediate resistor portion 31A in mutually opposite directions in the longitudinal direction of the main substrate portion 29A.

By forming the intermediate resistor portion 31A and the elongate resistor portions 31B, 31C of the heating resistor 31 as a overall crank shape, the heating resistor 31 and thermo-sensitive resistors 32, 33 (to be described later) can be formed compactly on the main substrate portion 29A. The surface area of the heating resistor 31 (mounting surface area) is made as large as possible to enable a large contact surface area for the intake air flowing in the intake air passage 3.

The heating resistor 31 is heated by controlling the current value with a current control transistor 42 (to be described later), so as to maintain a constant temperature (for example approximately 240° C.). As a result the insulation substrate 29 can also be maintained at a constant temperature.

The first and second thermo-sensitive resistors 32, 33 formed together with the heating resistor 31 on the main substrate portion 29A, are formed by coating a thermo-sensitive material such as platinum on the insulation substrate, using a technique such as printing or sputtering, so as to give respective resistance values of RT1, RT2. They are disposed apart on the main substrate portion 29A before and after the heating resistor 31 with respect to the direction of the intake air flowing in the direction of arrow A in the intake air passage 3 (widthwise direction of the main substrate portion 29A).

Figure 10:
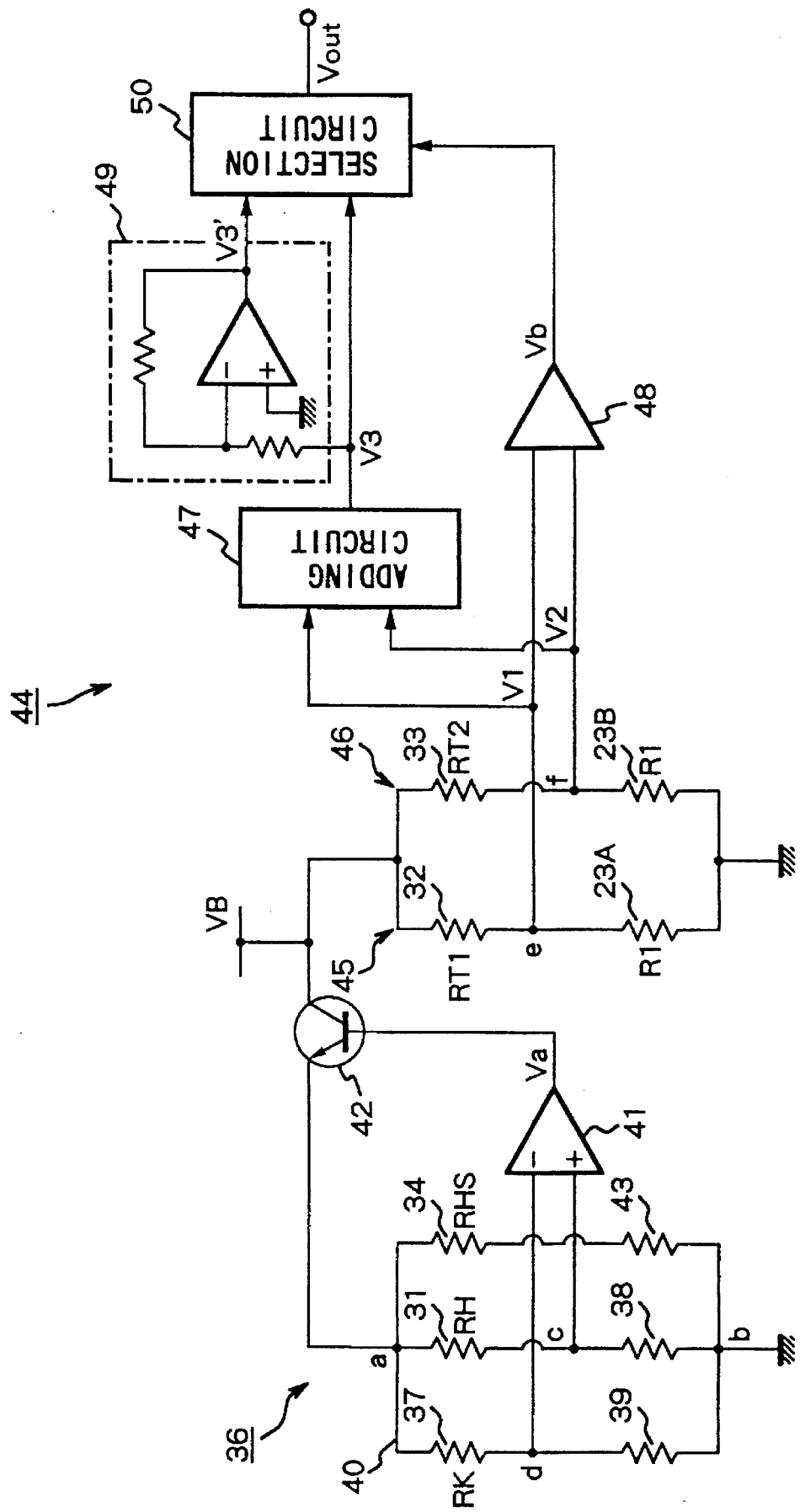
FIG. 10 is a circuit diagram showing a circuit structure of the heating type intake air quantity detection apparatus, according to the third embodiment.
Figure 11:
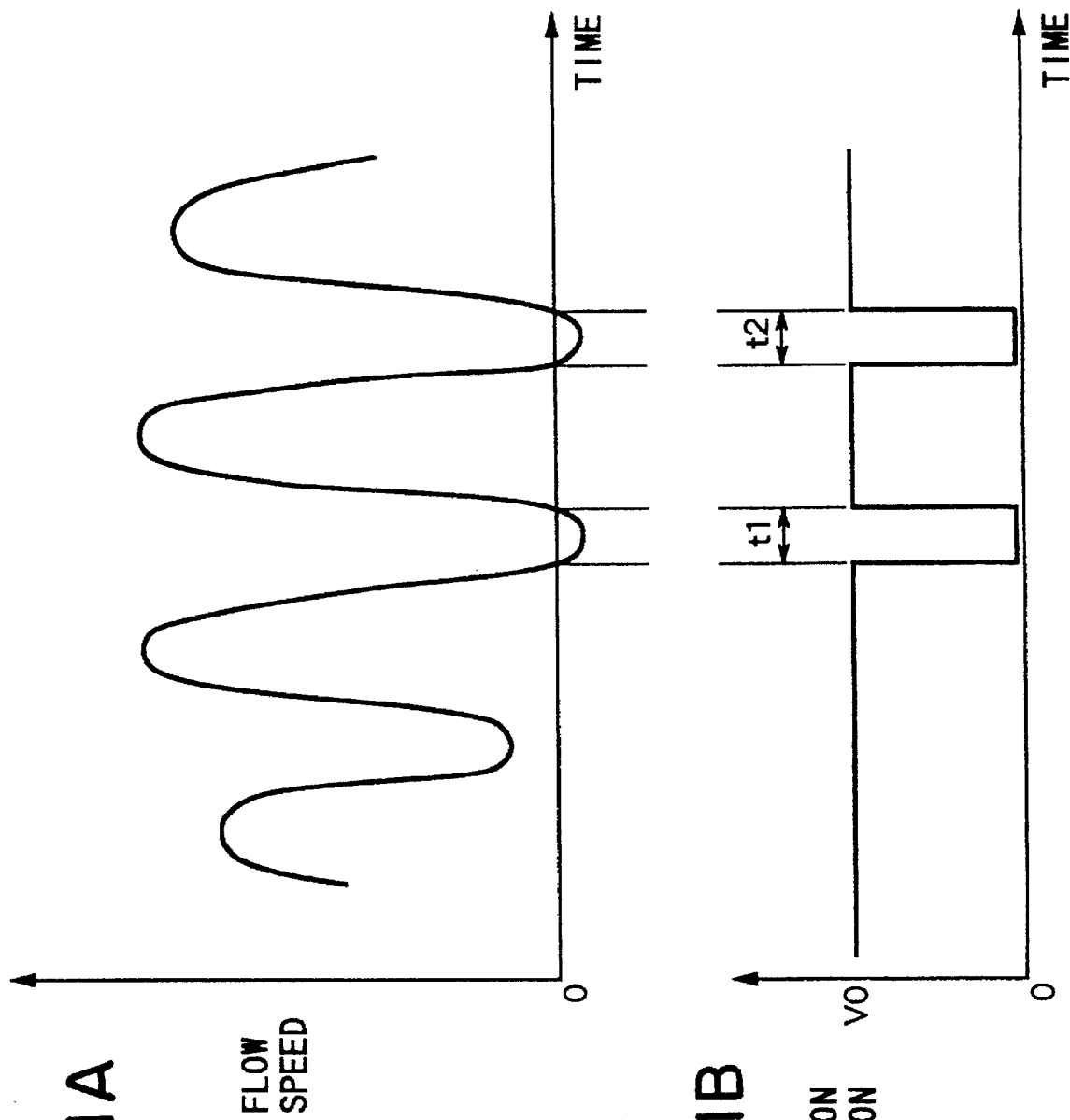
FIGS. 11A–11B are characteristic curve diagrams showing the relation between intake air flow speed and direction detection voltage Vb.

Here the first thermo-sensitive resistor 32 is located between the intermediate resistor portion 31A and the first elongate resistor portion 31B of the heating resistor 31, and is formed in a rectangular shape extending parallel to the elongate resistor portion 31B. Moreover, the second thermo-sensitive resistor 33 is located between the intermediate resistor portion 31A and the second elongate resistor portion 31C, and is formed in a rectangular shape extending parallel to the elongate resistor portion 31C. The thermo-sensitive resistors 32, 33 are formed with substantially equal areas on the main substrate portion 29A, and under normal conditions, as shown in FIG. 10, are heated by applying a current from the battery voltage VB. The thermo-sensitive resistors 32, 33 are cooled by the air flow so that their resistance is reduced, enabling the flow quantity of the intake air to be detected with good sensitivity.

The positional relationship between the heating resistor 31, the first thermo-sensitive resistor 32 and the second thermo-sensitive resistor 33, is such that they are aligned with respect to the normal direction flow of the intake air (in the direction of arrow A) in order from upstream as: first thermo-sensitive resistor 32, heating resistor 31 and second thermo-sensitive resistor 33. As a result, when the intake air flows in the normal direction (in the direction of the arrow A), the first thermo-sensitive resistor 32 is directly cooled by the intake air, while the second thermo-sensitive resistor 33 is heated by the heat from the heating resistor 31. Hence, the resistance value RT1 of the first thermo-sensitive resistor 32 is reduced corresponding to the flow rate, while the resistance value RT2 of the second thermo-sensitive resistor 33 remains substantially unchanged.

On the other hand, when the flow direction of the intake air in the intake air passage 3 is in the reverse direction (in the direction of the arrow B), the second thermo-sensitive resistor 33 is directly cooled by the intake air, while the first thermo-sensitive resistor 32 is heated by the heat from the heating resistor 31. Hence, the resistance value RT2 of the second thermo-sensitive resistor 33 is reduced corresponding to the flow rate, while the resistance value RT1 of the first thermo-sensitive resistor 32 remains substantially unchanged.

As a result, by comparing the resistance value RT1 of the first thermo-sensitive resistor 32 with the resistance RT2 of the second thermo-sensitive resistor 33, it can be determined if the flow direction of the intake air is in the normal direction or the reverse direction.

The auxiliary heater 34 is disposed on the sub-substrate portion 29B of the insulation substrate 29, and as with the heating resistor 31 and the thermo-sensitive resistors 32, 33, is formed as a film of a thermo-sensitive material such as platinum, using a technique such as printing or sputtering, so as to give a resistance value of RHS. The auxiliary heater 34 heats the sub-substrate portion 29B of the insulation substrate 29, so that heat from the main substrate portion 29A (from the heating resistor 31) is prevented from escaping to the detector holder 26 by way of the sub-substrate portion 29B. Moreover, since the slit 30 is formed between the main substrate portion 29A and the sub-substrate portion 29B, heating of the first thermo-sensitive resistor 32 by heat from the auxiliary heater 34 is prevented. Therefore, the addition of heat from the auxiliary heater 34 to the first and second thermo-sensitive resistors 32, 33 at the time of detection is prevented. On the other hand, since the auxiliary heater 34 is connected between the emitter of the current control transistor 42 and earth by way of a resistor 43, the current applied thereto can be controlled by controlling the current of the current control transistor 42.

Terminals 35 (six for example) are disposed at the base end of the insulation substrate 29, and are arranged in line at predetermined spacing in a widthwise direction of the insulation substrate 29. The terminals 35 are connected to respective terminals (not shown) of the detector holder 26, by fitting the base end of the insulation substrate 29 into the slot of the detector holder 26. By means of the terminals 35, the heating resistor 31, the first and second thermo-sensitive resistors 32, 33, and the auxiliary heater 34 formed on the insulation substrate 29, are connected to the respective electrical components provided in the circuit casing 27, thereby making up a flow detection processing circuit as shown in FIG. 10.

FIG. 10 shows the flow detection processing circuit according to the embodiment.

In FIG. 10, a current control circuit 36 acts as a temperature control device for maintaining the temperature of the insulation substrate 29 at a constant temperature by controlling the current value applied to the heating resistor 31 to thereby keep the temperature of the heating resistor 31 constant. The current control circuit 36 comprises, a bridge circuit 40 made up of the heating resistor 31: temperature compensating resistor 37 and adjustment resistors 38, 39, a differential amplifier circuit 41 for detecting a difference in voltage between connection points c, d of the bridge circuit 40, and a current control transistor 42 for controlling the current value applied to the connection points a, b of the bridge circuit 40. The bridge circuit 40 is constructed so that the product of resistance values of respectively opposing sides are equal. The connection point "a" between the heating resistor 31 and the temperature compensating resistor 37 is connected to the emitter side of the current control transistor 42 and to one end of the auxiliary heater 34, while the connection point "b" between the adjustment resistors 38, 39 is connected to ground and to the other end of the auxiliary heater 34 via the resistor 43.

In the bridge circuit 40, the heating resistor 31 and adjustment resistor 38, the temperature compensating resistor 37 and adjustment resistor 39 are respectively connected in series, while the respective connection points "c", "d" are connected to the input terminal of the differential amplifier circuit 41.

The temperature compensating resistor 37 is provided on the detector holder 26 in the vicinity of the heating resistor 31. The resistance value RK of the temperature compensating resistor 37 is not influenced by the flow of the intake air, and changes only with the temperature of the intake air.

With the bridge circuit 40 constructed in this manner, when in a balanced condition, the output from the differential amplifier circuit 41 becomes zero. On the other hand, when the balance of the bridge circuit 40 collapses, that it to say, when the insulation substrate 29 is cooled by the intake air, so that the temperature of the heating resistor 31 drops, since the resistance value RH of the heating resistor 31 is reduced, then a voltage difference is produced between the connection points "c", "d" so that a current control voltage Va is output to the base of the current control transistor 42 from the differential amplifier circuit 41. As a result, the current control transistor 42 controls the current applied to the bridge circuit 40 to keep the cooled heating resistor 31 at a constant temperature thereby restoring the balance of the bridge circuit 40. At this time, the insulation substrate 29 also is restored to a constant temperature.

With the current control transistor 42, the collector is connected to the battery voltage VB, the base is connected to the output side of the differential amplifier circuit 41, while the emitter is connected to the connection point "a" of the bridge circuit 40 and to one end of the auxiliary heater 34. Moreover with the current control transistor 42, the emitter current is controlled to correspond to the change in the base current caused by the output (current control voltage Va) from the differential amplifier circuit 41. As a result, the current control transistor 42 controls the current value applied to the bridge circuit 40 and carries out feedback control to maintain the temperature of the heating resistor 31 (insulation substrate 29) at a constant temperature.

The detection processing circuit 44 comprises: a first current detection circuit 45, a second current detection circuit 46, an adding circuit 47, a comparator circuit 48, an inversion circuit 49, and a selection circuit 50 (all to be described later). The detection processing circuit 44 is constructed so as to detect the flow and direction of the intake air based on a change in the respective resistance values RT1, RT2 of the first and second thermo-sensitive resistors 32, 33.

The first current detection circuit 45 is constructed with the first thermo-sensitive resistor 32 having a resistance value RT1 connected in series to the reference resistor 23A having a resistance value R1. The first current detection circuit 45 is connected between the battery voltage VB and the earth, with the connection point "e" between the first thermo-sensitive resistor 32 and the reference resistor 23A connected to the adding circuit 47 and the comparator circuit 48 (to be described later). The first current detection circuit 45 outputs a change in resistance value RT1 of the first thermo-sensitive resistor 32 as a first flow voltage V1.

The second current detection circuit 46 is constructed substantially the same as the first current detection circuit 45, with a second thermo-sensitive resistor 33 having a resistance value RT2 connected in series to a reference resistor 23B having a resistance value R1. The second current detection circuit 46 is connected between the battery voltage VB and the earth, with the connection point "f" between the second thermo-sensitive resistor 33 and the reference resistor 23B connected to the adding circuit 47 and the comparator circuit 48. The second current detection circuit 46 outputs a change in resistance value RT2 of the second thermo-sensitive resistor 33 as a second flow voltage V2.

The input side of the adding circuit 47 is connected to the connection point "e" of the first current detection circuit 45 and the connection point "f" of the second current detection circuit 46, while the output side is connected to the inversion circuit 49 and the selection circuit 50. A flow addition voltage V3 output from the adding circuit 47 as a flow adding signal, is determined by the following equation:

$$V3 = V1 + V2$$

The comparator circuit 48 constitutes the flow direction detection step or means. The connection point "e" of the first current detection circuit 45 and the connection point "f" of the second current detection circuit 46 are connected to the input side of the comparator circuit 48, while the output side is connected to the selection circuit 50. The comparator circuit 48 compares the first flow voltage V1 and the second flow voltage V2 and when V1>V2, since this indicates that the intake air flow is in the normal direction, it outputs a direction detection voltage Vb of voltage value V0 as shown in FIGS. 11A–11B while when V1<V2, since this indicates that the intake air flow is in the reverse direction, it outputs a voltage value for the flow addition voltage V3', to the selection circuit 50.

The selection circuit 50 constitutes, together with the inversion circuit 49, the intake air quantity detection signal output step or means for each flow direction. In the case of normal flow for example, based on the direction detection voltage Vb output by way of the comparator circuit 48 (refer to FIG. 10), the selection circuit 50 outputs from an output terminal to a control unit (not shown in the figure), a flow addition voltage V3 from the adding circuit 47 as an output signal Vout. In the case of a reverse flow, it outputs from the output terminal to the control unit, an inverted flow addition voltage V3' from the inversion circuit 49 as the output signal Vout.

The heating type intake air flow quantity detection apparatus 21 according to the present embodiment has the above described construction. The intake air flow quantity detection operation for the detection processing circuit 44 will now be described.

When the intake air flow is in the direction of arrow A (normal direction), the first thermo-sensitive resistor 32 located upstream on the insulation substrate 29 is cooled by the intake air flow, while the second thermo-sensitive resistor 33 located downstream is heated by the heat from the heating resistor 31. As a result, the first flow voltage V1 output from the first current detection circuit 45 becomes greater than the second flow voltage V2 output from the second current detection circuit 46, and a normal direction detection voltage Vb (voltage value V0) is output from the comparator circuit 48 to the selection circuit 50.

The adding circuit 47 adds the input flow voltages V1, V2 and outputs these as a flow addition voltage V3 to the subsequent selection circuit 50 and to the inversion circuit 49, and the inversion circuit 49 outputs this as an inverted flow addition voltage V3' to the selection circuit 50.

In the selection circuit 50, selection of the flow addition voltage V3 output from the adding circuit 47, and the inverted flow addition voltage V3' output from the inversion circuit 49 is made based on the direction detection voltage Vb from the comparator circuit 48. In this case, since the direction detection voltage Vb is a signal with voltage value V0 indicating normal direction flow, then the flow addition voltage V3 is selected, so that the flow addition voltage V3 for the normal direction flow is output from the output terminal to the control unit as the output signal Vout.

On the other hand, when the air flow is in the direction of arrow B (reverse flow), the second thermo-sensitive resistor 33 located upstream with respect to the reverse flow direction, on the insulation substrate 29, is cooled by the air flow, while the first thermo-sensitive resistor 32 located downstream is heated by the heat from the heating resistor 31. As a result, the second flow voltage V2 output from the second current detection circuit 46 becomes greater than the first flow voltage V1 output from the first current detection circuit 45, and a reverse direction detection voltage Vb (voltage value zero) is output from the comparator circuit 48 to the selection circuit 50.

The adding circuit 47 outputs the flow addition voltage V3 to the selection circuit 50 and to inversion circuit 49, while the inversion circuit 49 outputs the inverted flow addition voltage V3' to the selection circuit 50.

In the selection circuit 50, selection of the flow addition voltage V3 output from the adding circuit 47, and the inverted flow addition voltage V3' output from the inversion circuit 49 is made based on the direction detection voltage Vb from the comparator circuit 48. In this case, since the direction detection voltage Vb is a signal with voltage value zero indicating reverse direction flow, then the inverted flow addition voltage V3' is selected, so that the flow addition voltage V3' for the reverse direction flow is output from the output terminal to the control unit as the output signal Vout.

In this way, the intake air flow quantity and direction can be accurately detected by the control unit based on the output signal Vout, thus enabling accurate control of the air fuel ratio, and improved engine performance.

The current control circuit 36 for keeping the insulation substrate 29 at a constant temperature will now be described.

When the heating resistor 31 (insulation substrate 29) is cooled by the intake air, a voltage difference is produced between the connection points "c" and "d", and this difference is detected by the differential amplifier circuit 41 and output as a current control voltage Va. Since the emitter current of the current control transistor 42 is controlled by this current control voltage Va output from the differential amplifier circuit 41, the current applied to the heating resistor 31 is increased so that the heating resistor 31 (insulation substrate 29) is kept at a constant temperature.

Therefore, since the temperature of the insulation substrate 29 can be kept at a constant temperature, accurate flow detection using the thermo-sensitive resistors 32, 33 can be made, enabling an even higher accuracy in intake air flow quantity detection.

Moreover the current control circuit 36 is provided independently of the detection processing circuit 44 for detecting the flow quantity and direction. Therefore, even in cases such as at the time of starting the vehicle engine when the heating resistor 31 has not yet reached a constant temperature, since the thermo-sensitive resistors 32, 33 are heated simultaneously by the heating resistor 31, then the possibility of large erroneous differences due to the insulation substrate 29 having not attained a constant temperature can be prevented. Moreover, compared to the case with the heating type intake air flow quantity detection apparatus for detecting the flow quantity using the change in resistance value of the heating resistor 31, with the heating type intake air flow quantity detection apparatus 21 according to the present invention the heat-up time can be made extremely short so that erroneous control of the A/F control at the time of engine start-up can be reliably prevented.

With the heating type intake air flow quantity detection apparatus 21 according to the present embodiment, since the heating resistor 31 is formed on the insulation substrate 29, and the first and second thermo-sensitive resistors 32, 33 are formed before and after the heating resistor 31, the number of components can be reduced, and the intake air flow quantity and also direction can be detected by means of the first and second thermo-sensitive resistors 32, 33.

Moreover, with the detection processing circuit 44, the first current detection circuit 45 outputs a change in the resistance value RT1 of the first thermo-sensitive resistor 32 corresponding to the flow as a first flow voltage V1, while the second current detection circuit 46 outputs a change in the resistance value RT2 of the second thermo-sensitive resistor 33 corresponding to the flow as a second flow voltage V2. Furthermore, the adding circuit 47 adds the flow voltages V1, V2 and outputs these as a flow addition voltage V3 to the selection circuit 50 and to the inversion circuit 49, and the inversion circuit 49 outputs the input flow addition voltage V3 as an inverted flow addition voltage V3' to the selection circuit 50. On the other hand, the comparator circuit 48 compares the size of first and second flow voltages V1 and V2 and outputs a normal flow or reverse flow direction detection voltage Vb to the selection circuit 50. Moreover, with the selection circuit 50, when, based on the direction detection voltage Vb, the intake air flow direction is in the normal direction, the selection circuit 50 selects the flow addition voltage V3 from the adding circuit 47, and outputs this from the output terminal to a control unit as an output signal Vout. On the other hand, when the intake air flow is in the reverse direction, it outputs to the control unit, the inverted flow addition voltage V3' from the inversion circuit 49 as the output signal Vout.

In this way, the detection of a flow as normal even though reverse flow is present as with the conventional technology, can be prevented, so that the flow quantity and direction of the intake air can be accurately detected.

The current control circuit 36 for keeping the temperature of the insulation substrate 29 at a constant temperature, is made up of the bridge circuit 40 including the heating resistor 31, the differential amplifier circuit 41, and the current control transistor 42. Therefore, when the temperature of the insulation substrate 29 drops, and the resistance of the heating resistor 31 also drops, this drop amount causes a difference with the resistance of the temperature compensating resistor 37, and is output from the differential amplifier circuit 41 as a current control voltage Va. The current value to be applied to the bridge circuit 40 can thus be adjusted corresponding to the current control voltage Va by the current control transistor 42, to continually maintain the insulation substrate (heating resistor 31) at a constant temperature. Moreover, the flow quantity detected by the first and second current detection circuits 45, 46 can be accurately detected.

With the current control circuit 36, the first and second thermo-sensitive resistors 32, 33 carry out detection even in the case such as at the time of starting the vehicle engine, when the heating resistor 31 has not yet reached a constant temperature. However, since the heating resistor 31 and the thermo-sensitive resistors 32 and 33 on the insulation substrate 29 are heated approximately simultaneously, then the possibility of large erroneous differences in the flow voltages V1, V2 detected by the thermo-sensitive resistors 32, 33 due to insulation substrate 29 having not attained a constant temperature can be prevented. As a result, with the heating type intake air flow quantity detection apparatus 21 according to the present invention, the heat up time until starting accurate flow quantity detection can be shortened.

The auxiliary heater 34 is formed on the sub-substrate portion 29B of the insulation substrate 29. Therefore since the sub-substrate portion 29B is heated by the auxiliary heater 34, this heating can supplement the heating of the insulation substrate 29 by the heating resistor 31. As a result, the escape of the heat from the main substrate portion 29A to the flow meter body 22 by way of the sub-substrate portion 29B can be prevented, thereby reducing the temperature change of the insulation substrate 29 and enabling an improvement in the flow quantity and flow direction detection sensitivity.

Moreover, since the slit 30 is formed between the main substrate portion 29A and the sub-substrate portion 29B of the insulation substrate 29 so that the heat from the auxiliary heater 34 does not affect the first thermo-sensitive resistor 32, then heating influence by the auxiliary heater 34 on the first thermo-sensitive resistor 32 can be effectively prevented so that the intake air flow quantity can be accurately detected by the first and second current detection circuits 45 and 46.

Figure 12:
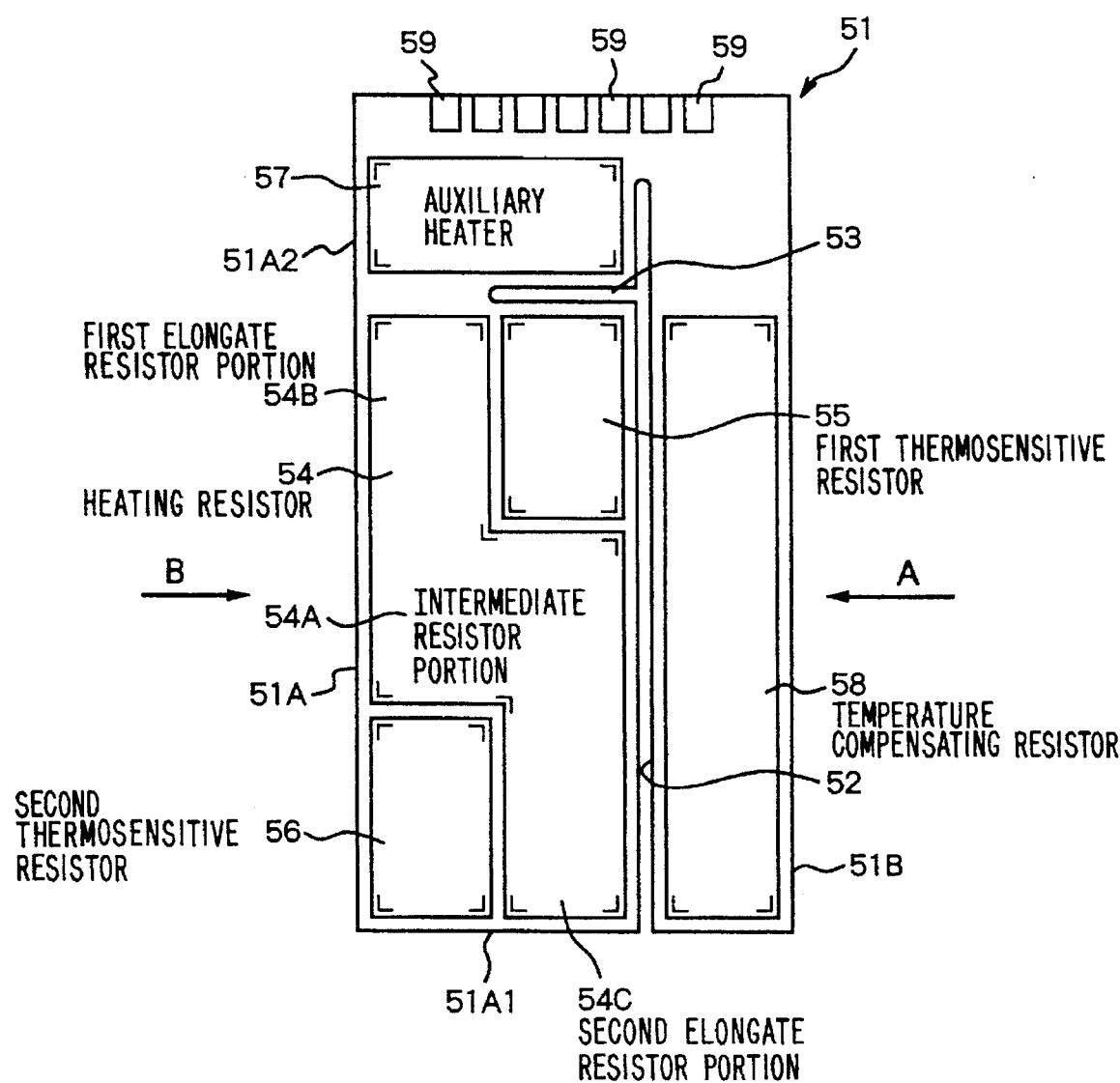
FIG. 12 is a plan view showing a heating resistor, first and second thermo-sensitive resistors, an auxiliary heater, and a temperature compensating resistor formed on an insulation substrate, according to a fourth embodiment.
Figure 13:
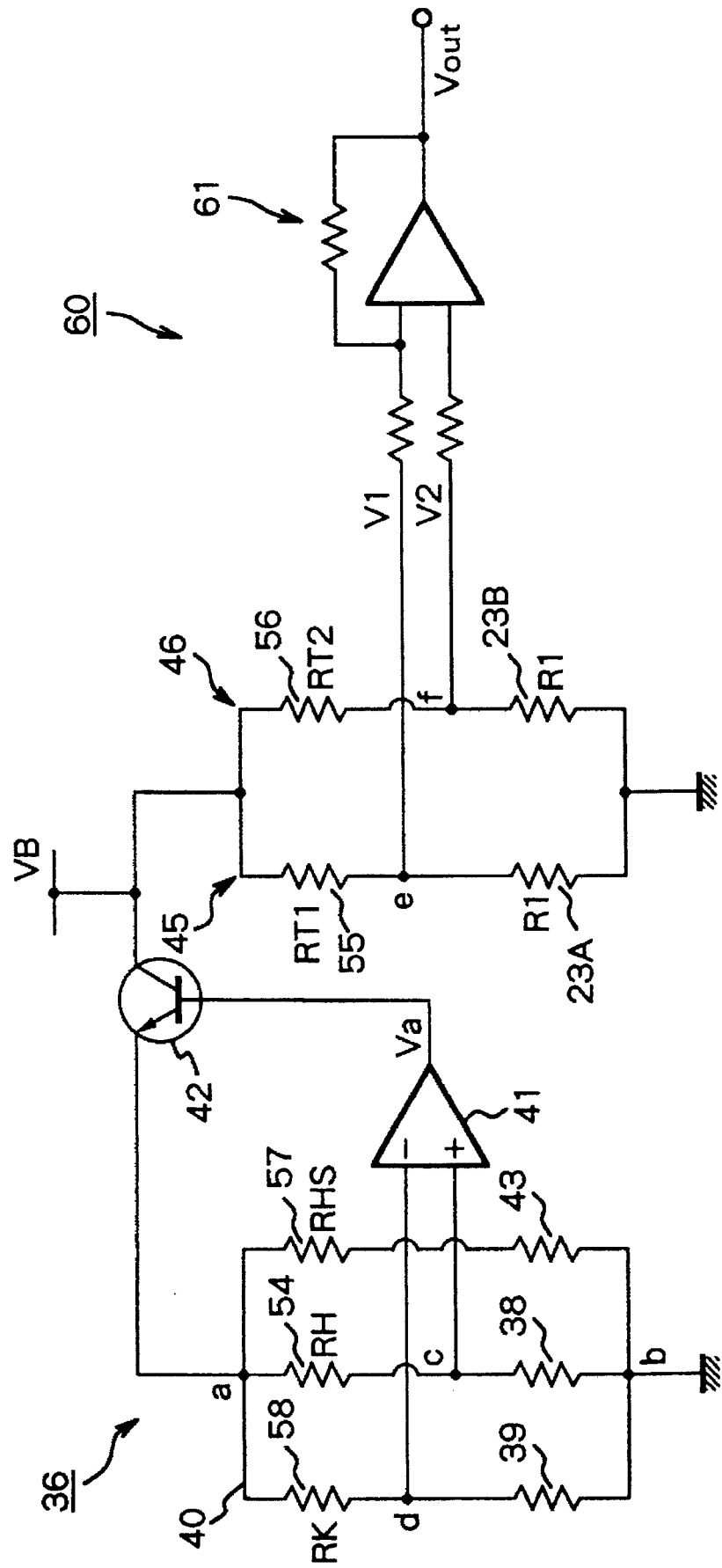
FIG. 13 is a circuit diagram showing a circuit structure of a heating type intake air quantity detection apparatus, according to the fourth embodiment.

A fourth embodiment according to the present invention is shown in FIG. 12 and FIG. 13. A feature of this embodiment is that the heating resistor, first and second thermo-sensitive resistors, auxiliary heater, and temperature compensating resistor are formed as a film on a single insulation substrate, and computational circuits are used in the detection circuit for intake air flow rate and flow direction. Structural elements the same as those of the third embodiment are indicated by the same symbols and description is omitted.

In the figures, an insulation substrate 51 is made from an insulating material such as glass, alumina, aluminium nitride formed as a rectangular planar shape. The base end is a fixed end fitted to the detector holder 26, while the tip end is a free end comprising first and second substrate portions 51A, 51B. A first slit 52 is formed between the first and second substrate portions 51A, 51B extending from the tip end to the base end. The second substrate portion 51B is located further upstream than the first substrate portion 51A with respect to the normal direction of intake air (direction of arrow A). A temperature compensating resistor 58 (to be described later), is formed on the second substrate portion 51B.

The first substrate portion 51A comprises a main substrate portion 51A1 of rectangular shape with a tip end forming the free end, and a sub-substrate portion 51A2 located at the base end of the main substrate portion 51A1 and fitted to the detector holder 26. A second slit 53 connected to the first slit 52 is formed between the sub-substrate portion 51A2 and the main substrate portion 51A1, extending in a widthwise direction from one side to the other side (in the direction of arrow A). The first slit 52 and the second slit 53 need not necessarily be connected as shown in FIG. 12.

A heating resistor 54 is formed as a film on the main substrate portion 51A1 of the insulation substrate 51, by coating a thermo-sensitive material such as platinum using a technique such as printing or sputtering, so as to give a resistance value RH. As with the heating resistor 31 of the third embodiment, it comprises an intermediate resistor portion 54A, and first and second elongate resistor portions 54B and 54C extending from opposite ends of the intermediate resistor portion 54A in mutually opposite directions in the longitudinal direction of the insulation substrate 51. As with the beforementioned heating resistor 31, the heating resistor is heated by controlling the current value with the current control transistor 42 as discussed for the third embodiment, so as to maintain a constant temperature (for example approximately 240° C.).

First and second thermo-sensitive resistors 55, 56 are formed as a film on the main substrate portion 51A1 of the insulation substrate 51 by coating a thermo-sensitive material such as platinum, using a technique such as printing or sputtering, so as to give respective resistance values of RT1, RT2. The first thermo-sensitive resistor 55 is located between the first elongate resistor portion 54B of the heating resistor 54 and the intermediate resistor portion 54A, and is formed in parallel with the elongate resistor portion 54B, while the second thermo-sensitive resistor 56 is arranged symmetrically opposite with respect to the heating resistor 54. The first thermo-sensitive resistor 55 is located upstream with respect to the normal flow direction of the intake air (direction of arrow A), while the second thermo-sensitive resistor 56 is located downstream.

An auxiliary heater 57 is located on the sub-substrate portion 51A2 of the insulation substrate 51, and as with the heating resistor 54 and the first and second thermo-sensitive resistors 55, 56, is formed as a film of a thermo-sensitive material such as platinum, using a technique such as printing or sputtering, so as to give a resistance value of RHS. The auxiliary heater 57 heats the sub-substrate portion 51A2 of the insulation substrate 51, so that heat from the main substrate portion 51A1 (from the heating resistor 54) is prevented from escaping to the detector holder 26 by way of the sub-substrate portion 51A2. Moreover, since the slit 53 is formed between the main substrate portion 51A1 and the sub-substrate portion 51A2, heating of the first thermo-sensitive resistor 55 by heat from the auxiliary heater 57 is prevented.

The temperature compensating resistor 58 is formed on the second substrate portion 51B, by coating a platinum film using a technique such as printing or sputtering. The temperature compensating resistor 58 has a resistance value RK, larger than that of the heating resistor 54, which is not influenced by the flow of the intake air and only detects temperature changes.

Terminals 59 (seven for example) are formed at the base end of the insulation substrate 51, and are arranged in line at predetermined spacing in a widthwise direction of the insulation substrate 51. The terminals 59 are connected to the respective terminals (not shown) of the detector holder 26, by fitting the base end of the insulation substrate 51 into the slot of the detector holder 26.

In this way, by fitting the insulation substrate 51 of the fourth embodiment, to the beforementioned flow meter body 22 of the third embodiment, then as shown in FIG. 13, a detection processing circuit 60 of the present embodiment and the current control circuit 36 are arranged substantially the same as for the flow detection processing circuit of the third embodiment.

Here since the current control circuit 36 has been described for the third embodiment, operational description is omitted.

The detection processing circuit 60 of the present embodiment, comprises a first flow detection circuit 45, a second flow detection circuit 46, and a differential amplifier circuit 61 (to be discussed later).

Connection points "e" and "f" of the first and second flow detection circuits 45, 46 are connected to the input side of the differential amplifier circuit 61, while a control unit (not shown) is connected to the output side. The differential amplifier circuit 61 carries out a computation as shown by the following equation to output an output signal Vout.

$$Vout = (V1 - V2) \times k$$

where k is a constant

In this way, by computing the difference between the first and second flow voltages V1, V2 in the differential amplifier circuit 61, then the output signal Vout can be output as a signal including intake air flow quantity and direction.

With the heating type intake air quantity detection apparatus of the present embodiment constructed in this way, the intake air flow quantity and direction can be detected in the same way as for third embodiment. Moreover, by arranging the current control circuit 36 for keeping the insulation substrate 29 at a constant temperature, separate from the detection processing circuit 60, then effects, such as a reduction in the heat-up time until commencing accurate flow detection at the time of vehicle engine start-up, can be obtained.

Figure 14:
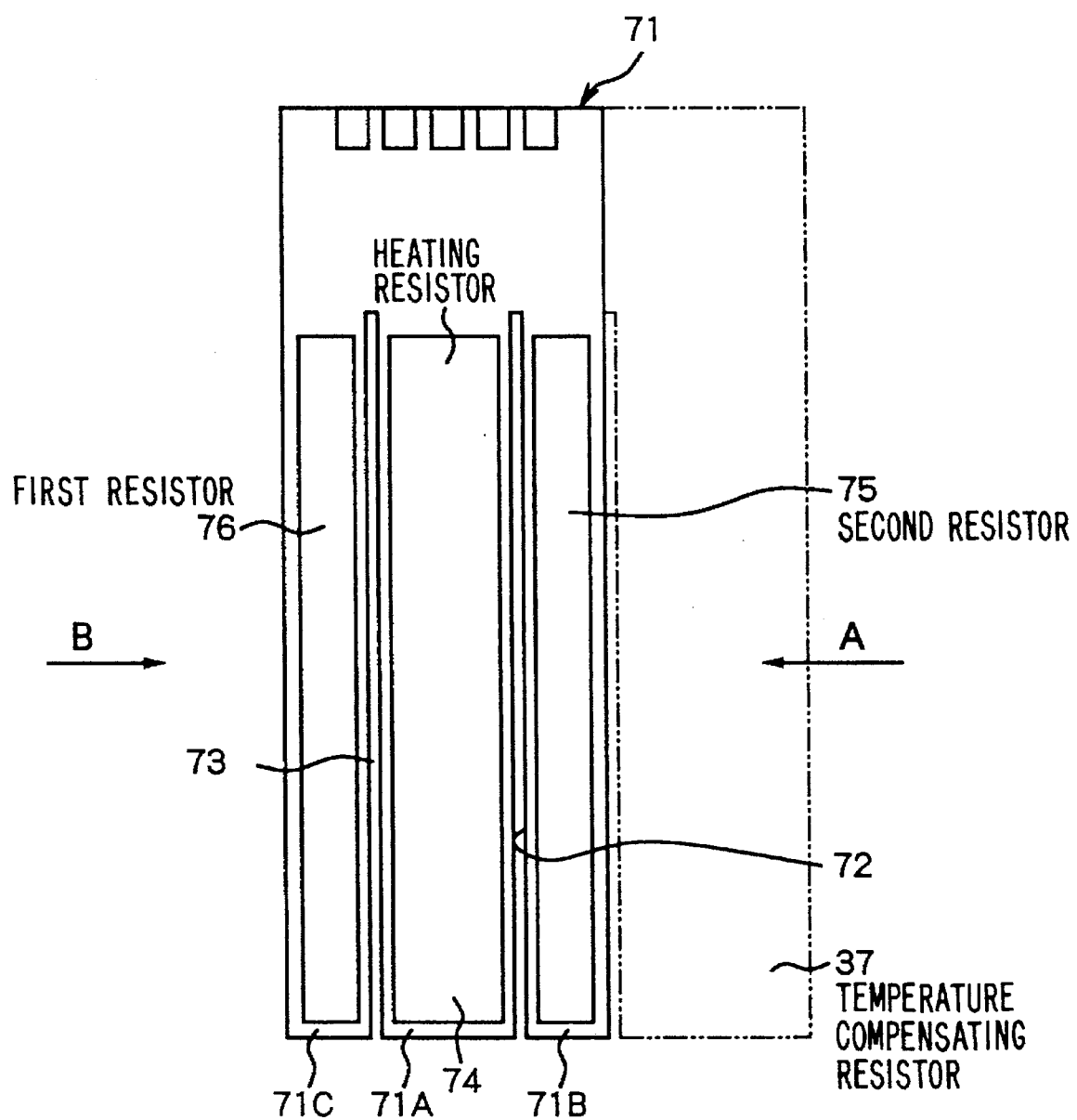
FIG. 14 is a plan view showing a heating resistor and first and second thermo-sensitive resistors formed on an insulation substrate, according to a variant example.

In the respective embodiments discussed above, the heating resistor 31(54), and the first and second thermo-sensitive resistors 32(55), 33(56) are formed as a film on the insulation substrate 29(51) as shown in FIGS. 9, 12. However the present invention is not limited to this arrangement, and a variant example as shown in FIG. 14, is also possible wherein slits 72, 73 are formed extending from the tip end of an insulation substrate 71 towards the base end. The insulation substrate 71 is thus divided into first second and third substrate portions 71A, 71B and 71C by the slits 72, 73, and respective heating resistor 74, first thermo-sensitive resistor 75, and second thermo-sensitive resistor 76 are formed as thin films on the first second and third substrate portions 71A, 71B, 71C. Moreover, in this case, the first substrate portion 71A preferably has a surface area which is relatively large compared to that of the other substrate portions 71B, 71C. In the case of this variant example, since the resistors 74, 75, 76 are separated by the slits 72 and 73, then the effect of the heat from the heating resistor 74 on the thermo-sensitive resistors 75, 76 by way of the insulation substrate 71 can be reduced. In addition, a temperature compensating resistor 37 shown by the dotted chain line may be formed as a single body. With the abovementioned embodiments, the first thermo-sensitive resistor 32(55) was located upstream with respect to the intake air flow direction while the second thermo-sensitive resistor 33(56) was located downstream. However, the present invention is not limited to this arrangement, and the first thermo-sensitive resistor 32(55) can be located downstream while the second thermo-sensitive resistor 33(56) can be located upstream. In this case, the direction detection voltage Vb from the comparator circuit 48 can be inverted and then output to the selection circuit 50.

Moreover, with the respective embodiments described above, the reference resistor 23 wound on the winding portion 24 of the flow meter body 22 is described as being disposed so as to protrude into the intake air passage 3. However, the present invention is not limited to this arrangement. For example, the reference resistor 23 may be provided together with the flow quantity adjustment resistor 38 in the circuit casing 27 on the outside of the intake air passage 3.

Furthermore, the abovementioned embodiments have been described as having an auxiliary heater 34(57). However, it will be obvious that the apparatus can be used even without an auxiliary heater 34(57).

INDUSTRIAL APPLICABILITY

The present invention as described above, is particularly applicable as an intake air flow quantity detection apparatus for setting the fuel injection quantity to a high accuracy in engines such as automotive engines incorporating an electronic injection control unit.

We claim:

1. A method of detecting an intake air quantity of an engine, comprising:

an intake air quantity detection step for detecting, irrespective of a flow direction of intake air, respective intake air quantities at two locations separated in the flow direction of the intake air in an engine intake air passage, and a flow direction step for detecting the flow direction of the intake air, based on the intake air quantity in which the flow direction has been discriminated, based on an intake air quantity detected at at least one of said two locations, and on said detected flow direction, wherein said flow direction detection step includes a step of detecting as a normal flow when the phase of pulsations of the intake air quantity detected at an upstream location of said two locations is ahead of the phase of pulsations of the intake air quantity detected at a downstream location of said two locations, and a step of detecting as a reverse flow when the phase of the pulsations of the intake air quantity detected at the upstream location is behind the phase of the pulsations of the intake air quantity detected at the downstream location.

2. A method of detecting the intake air quantity of an engine according to claim 1, wherein said intake air quantity detection step includes, detecting the intake air quantity using a hot wire type flow meter which controls an electrical current to a thermo-sensitive resistor provided in the intake passage so as to keep the resistance value of the thermo-sensitive resistor constant, and detecting the intake air quantity depending on the current value.

3. A method of detecting the intake air quantity of an engine according to claim 1, wherein said intake air quantity detection step includes, detecting the intake air quantity using a hot wire type flow meter which controls an electrical current to a thermo-sensitive resistor provided in the intake passage so as to keep a resistance value of the thermo-sensitive resistor constant, and detecting the intake air quantity depending on the current value.

4. A method of detecting the intake air quantity of an engine according to claim 1, wherein said intake air quantity detection step includes, detecting the intake air pressure using a pressure sensor, and converting the detected pressure into intake air quantity to thereby detect the intake air quantity.

5. A method of detecting the intake air quantity of an engine according to claim 1, wherein said intake air quantity detection step includes, detecting the intake air quantity at the upstream location of said two locations using a hot wire type flow meter which controls an electrical current to a thermo-sensitive resistor provided in the intake air passage so as to keep the resistance value of the thermo-sensitive resistor constant, and detects the intake air quantity depending on the current value, and detecting the intake air pressure at the downstream location using a pressure sensor, and converting the detected pressure into intake air quantity to thereby detect the intake air quantity.

6. A method of detecting the intake air quantity of an engine according to claim 1, wherein said intake air quantity detection step includes, detecting the intake air quantity based on changes in resistance values, due to intake air cooling, of thermo-sensitive resistors respectively provided at said two locations in the intake air passage, and said flow direction detection step includes, controlling the current to a heating resistor provided at a location between said two locations, so as to maintain a constant temperature, and detecting the flow direction of the intake air based on an inversion of a large/small relationship between the resistance values of the thermo-sensitive resistors at said two locations, corresponding to a change between normal flow and reverse flow of the intake air.

7. An apparatus for detecting an intake air quantity of an engine, comprising:

intake air quantity detection means for detecting, irrespective of a flow direction of intake air, respective intake air quantities at two locations separated in the flow direction of the intake air in an engine intake air passage, flow direction detection means for detecting the flow direction of the intake air, based on the intake air quantity detected at said two locations, and intake air quantity detection signal output means for each flow direction for outputting a detection signal for an intake air quantity in which the flow direction has been discriminated, based on an intake air quantity detected at at least one of said two locations, and on said detected flow direction, wherein said flow direction means detects as a normal flow when a phase of the pulsations of the intake air quantity detected at an upstream location of said two locations is ahead of a phase of pulsations of the intake air quantity detected at a downstream location of said two locations, and detects as a reverse flow when the phase of the pulsations of the intake air quantity detected at the upstream location is behind the phase of pulsations of the intake air quantity detected at the downstream location.

8. An apparatus for detecting the intake air quantity of an engine according to claim 7, wherein said intake air quantity detection means, detects the intake air quantity using a hot wire type flow meter which controls an electrical current to a thermo-sensitive resistor provided in the intake passage so as to keep a resistance value of the thermo-sensitive resistor constant, and detects the intake air quantity depending on the current value.

9. An apparatus for detecting the intake air quantity of an engine according to claim 7, wherein said intake air quantity detection means, detects the intake air pressure using a pressure sensor, and converts the detected pressure into intake air quantity to thereby detect the intake air quantity.

10. An apparatus for detecting the intake air quantity of an engine according to claim 7, wherein said intake air quantity detection means, detects the intake air quantity at the upstream location of said two locations using a hot wire type flow meter which controls an electrical current to a thermo-sensitive resistor provided in the intake passage so as to keep the resistance value of the thermo-sensitive resistor constant, and detects the intake air quantity depending on the current value, and detects the intake air pressure at the downstream location using a pressure sensor, and converts the detected pressure into intake air quantity to thereby detect the intake air quantity.

11. An apparatus for detecting the intake air quantity of an engine according to claim 7, wherein said intake air quantity detection means detects the intake air quantity based on changes in resistance values, due to intake air cooling, of thermo-sensitive resistors respectively provided at said two locations in the intake air passage, and said flow direction detection means, controls the current to a heating resistor provided at a location between said two locations, so as to maintain a constant temperature, and detects the flow direction of the intake air based on an inversion of a large/small relationship between the resistance values of the thermo-sensitive resistors at said two locations, corresponding to a change between normal flow and reverse flow of the intake air.

12. A method of detecting an intake air quantity of an engine, comprising:

an intake air quantity detection step for detecting, irrespective of a flow direction of intake air, respective intake air quantities at two locations separated in the flow direction of the intake air in an engine intake air passage, and a flow direction step for detecting the flow direction of the intake air, based on the intake air quantity in which the flow direction has been discriminated, based on an intake air quantity detected at at least one of said two locations, and on said detected flow direction, wherein said intake air quantity detection step includes a step of detecting the intake air quantity based on changes in resistance values, due to intake air cooling, of thermo-sensitive resistors respectively provided at said two locations in the intake air passage, and wherein said flow direction detection step includes a step of controlling a current supplied to a heating resistor provided at a location between said two locations, so as to maintain a constant temperature, and a step of detecting the flow direction of the intake air based on an inversion of a large/small relationship between respective resistance values of the thermo-sensitive resistors at said two locations, corresponding to a change between a normal flow and a reverse flow of the intake air.

13. A method of detecting the intake air quantity of an engine according to claim 12, wherein said intake air quantity detection signal output step for each flow direction includes, outputting a signal having a discriminating signal for said detected flow direction attached to an intake air quantity detection signal obtained by adding the intake air quantities detected at said two locations.

14. A method of detecting the intake air quantity of an engine according to claim 12, wherein said intake air quantity detection signal output step for each flow direction includes, outputting an intake air quantity detection signal obtained by subtracting an intake air quantity detection value detected at one of said two locations from an intake air quantity detection value detected at the other of said two locations.

15. A method of detecting the intake air quantity of an engine according to claim 12, wherein said thermo-sensitive resistors at said two locations and said heating resistor comprise films on the surface of a single insulation substrate which is connected to a wall of the intake air passage and aligned with the flow direction of the intake air.

16. An apparatus for detecting an intake air quantity of an engine, comprising:

intake air quantity detection means for detecting, irrespective of a flow direction of intake air, respective intake air quantities at two locations separated in the flow direction of the intake air in an engine intake air passage, flow direction detection means for detecting the flow direction of the intake air, based on the intake air quantity detected at said two locations, intake air quantity detection signal output means for each flow direction for outputting a detection signal for an intake air quantity in which the flow direction has been discriminated, based on an intake air quantity detected at at least one of said two locations, and on said detected flow direction, a plurality of thermo-sensitive resistors respectively provided at said two locations in the intake air passage, and a heating resistor provided at a location between said two locations, said heating resistor providing an amount of heat in accordance with an amount of current supplied to the heating resistor, wherein said intake air quantity detection means detects the intake air quantity based on changes in resistance values, due to intake air cooling, of the thermo-sensitive resistors respectively provided at said two locations in the intake air passage, and wherein said flow direction detection means controls the current supplied to the heating resistor, so as to maintain a constant temperature, and detects the flow direction of the intake air based on an inversion of a large/small relationship between respective resistance values of the thermo-sensitive resistors at said two locations, corresponding to a change between a normal flow and a reverse flow of the intake air.

17. An apparatus for detecting the intake air quantity of an engine according to claim 16, wherein said intake air quantity detection means detects the intake air quantity using a hot wire type flow meter which controls an electrical current to a thermo-sensitive resistor provided in the intake passage so as to keep a resistance value of the thermo-sensitive resistor constant, and detects the intake air quantity depending on the current value.

18. An apparatus for detecting the intake air quantity of an engine according to claim 16, wherein said intake air quantity detection signal output means for each flow direction, outputs a signal having a discriminating signal for said detected flow direction attached to an intake air quantity detection signal obtained by adding the intake air quantities detected at said two locations.

19. An apparatus for detecting the intake air quantity of an engine according to claim 16, wherein said intake air quantity detection signal output means for each flow direction, outputs an intake air quantity detection signal obtained by subtracting an intake air quantity detection value detected at one of said two locations from an intake air quantity detection value detected at the other of said two locations.

20. An apparatus for detecting the intake air quantity of an engine according to claim 16, wherein said thermo-sensitive resistors at said two locations and said heating resistor comprise films on the surface of a single insulation substrate which is connected to a wall of the intake air passage and aligned with the flow direction of the intake air.

21. An apparatus for detecting the intake air quantity of an engine according to claim 20, wherein said insulation substrate is fitted to the apparatus body so as to face into the intake air passage, with a base end portion connected to the intake air passage wall, and an other end portion as a free end, and with an auxiliary heating element provided on the base end for suppressing the transmission of heat from the heating resistor to the intake air passage wall.

* * * * *